United States Patent [19]

Evertz et al.

[11] 4,081,187
[45] Mar. 28, 1978

[54] SPRINGING DEVICE PARTICULARLY FOR VEHICLES

[76] Inventors: Herbert Evertz, Speckbahn 63, D-581 Witten-Herbede; Hans Peter Geis, Am Hee 21, Witten-Herbede, both of Germany

[21] Appl. No.: 653,252

[22] Filed: Jan. 28, 1976

[30] Foreign Application Priority Data

Aug. 27, 1975 Germany .............................. 2538103

[51] Int. Cl.² ............................................. B60G 11/14
[52] U.S. Cl. ................................ 280/701; 267/20 R; 267/60; 267/173; 280/724
[58] Field of Search .............. 280/696, 701, 724, 725, 280/726, 666, 667, 670; 267/166, 167, 170, 173, 179, 60, 20 R, 20 A

[56] References Cited

U.S. PATENT DOCUMENTS

| | | | |
|---|---|---|---|
| 1,118,761 | 11/1914 | Griffith | 280/670 |
| 2,507,424 | 5/1950 | Stull | 267/20 R |
| 2,801,112 | 7/1957 | Piper | 280/701 |
| 2,801,113 | 7/1957 | Piper | 280/701 |
| 2,904,343 | 9/1959 | Taber | 280/696 |

*Primary Examiner*—Joseph F. Peters, Jr.
*Assistant Examiner*—John A. Carroll
*Attorney, Agent, or Firm*—Michael J. Striker

[57] ABSTRACT

Helical spring is mounted between two lever arms which are hinged together at one end; the spring is attached at its ends to disks which are pivoted rotatably to the lever arms, the spring axis being parallel but eccentric to the line joining the two pivot points. Rotation of the disks moves the spring closer to or farther from the hinge point, effectively changing the elastic constant between the distal ends of the lever arms, which are points of attachment to a vehicle chassis and to its running gear, respectively. Spring position may be adjusted by worm drive operated manually by crank or by motor controllable by driver from instrument panel; this adjusts vehicle springing to various vehicle loads.

9 Claims, 9 Drawing Figures

SPRINGING DEVICE PARTICULARLY FOR VEHICLES

BACKGROUND OF THE INVENTION

This invention pertains to adjustable springing mechanisms, particularly those useful for springing vehicle chassis upon running gear under varying loads.

Roadability and driving characteristics of an automobile depend controllingly upon the vehicle being optimally loaded. In the making of an automobile the springing is designed for a particular load range. This optimal load range is in most cases very narrow. But only within this narrow range —more exactly, only in its center— do the driving characteristics reach their optimum.

For example, in a front-engined passenger automobile which contains only the driver and perhaps one additional passenger, but no luggage or other additional load, the rear of the car will point somewhat upwards, because the rear wheels are too lightly loaded. The cocked attitude of the chassis which this produces impairs the driving characteristics and predisposes to possible skidding. For this reason, many drivers load ballast in the trunk if they are traveling alone or with one passenger.

Automobiles of the luxury class are frequently equipped with air suspension, which the driver may always adjust according to the load and so level the vehicle to the optimal attitude. This leveling may even be effected automatically In the optimal attitude the distance between the chassis and the axle always has the same value, independently of the vehicle load. With such air suspension the amount of load impairs the driving characteristics hardly at all, and the riding comfort not at all.

Such an installation is very expensive and cannot be considered for the large majority of automobiles. But it is precisely small and medium size vehicles in which the defects of prior art springing have the greatest effect, because the ratio of passenger and load weight to vehicle weight is relatively high. Thus for such vehicles and urgent need exists for a possibility of adjusting the springing means, by which the springing may be accommodated to the currently existing load, and the distance between the chassis and the axle may be adjusted to the best value for driving behavior and riding comfort.

SUMMARY OF THE INVENTION

An object of the present invention is to provide such an adjustable springing means. To this end, the springing device which is located between two bodies to be sprung apart contains a helical or other spring whose spring ends are anchored to two disks which are adjustably rotatable about a common axis, not coincident with the spring axis. The spring axis moves eccentrically with respect to the axis of rotation; each rotatable disk is connected by ball or roller bearings to an associated fixed plate which is fastened to one of the bodies to be sprung apart. Preferably a shock absorber is installed with its axis coincident with the spring axis. The adjustment of each pair of rotatable disks may be accomplished by a worm which engages worm gear teeth formed in the rim of the rotatable disk. The rotatable disks with worm gear rims which are associated with a given pair of wheels (e.g. front or rear) may be driven by worms which are mounted on a common adjustment shaft and are of such pitch or sense that they produce (relative to one another) oppositely directed rotation. An adjustment motor which drives the adjustment shaft may be controllable manually or automatically from a central control on the instrument wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
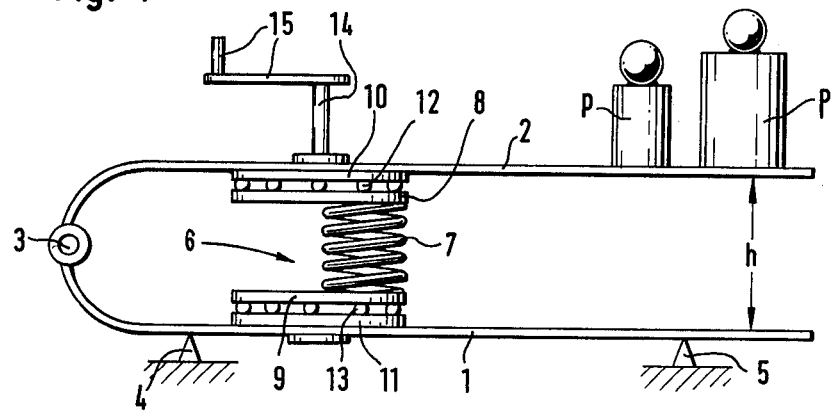
FIG. 1 represents schematically and in elevation the principle of the invention by two lever arms pivoted together with a continuously adjustable spring unit located between them, the upper lever arm being loaded with weights $P + p$, the lower lever arm resting on fixed supports.

Referring to FIG. 1, the lower lever arm 1 is movably linked to upper lever arm 2 by joint 3 and rests upon fixed support 4, 5. A spring unit 6 is arranged rotatably, in accordance with the invention, between the two lever arms 1 and 2. Spring unit 6 comprises a helical spring 7 which is fastened to two rotatable disks 8 and 9. Each rotatable disk 8 or 9 forms, with an associated fixed disk 10 or 11 which is anchored to a lever arm 1 or 2, and with a complement of bearing bells 12 or 13, a ball bearing 8, 10, 12 or 9, 11, 13. The upper rotatable disk 8 is connected to rotate together with a shaft 14, which is operable by a crank 15.

Figure 2:
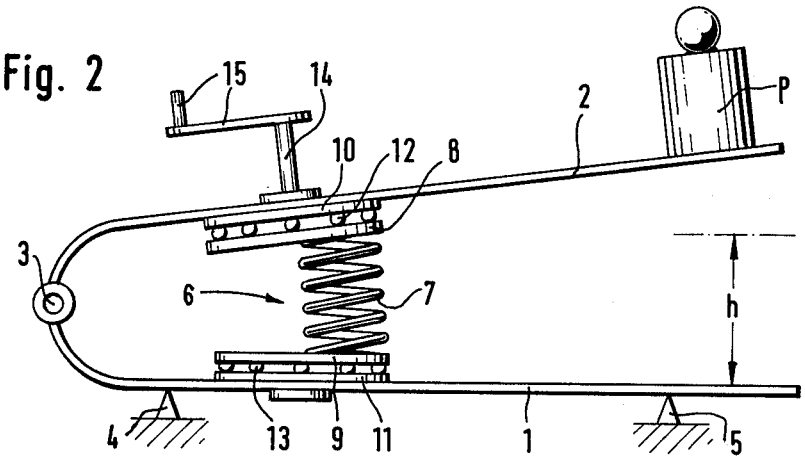
FIG. 2 represents the elements of FIG. 1 without the weight $p$.

Two weights $P$ and $p$ are located upon the upper lever arm 2. If weight $p$ is removed, the helical spring 7 drives the upper lever arm 2 upward as FIG. 2 represents. This situation represents in principle the situation of an automobile too lightly loaded in the rear. By appropriate rotation of crank 15 spring unit 6 may be brought to such a position that weight and spring force are balanced, and thus the distance $h$ between lever arm 1 and lever arm 2 shows the same magnitude as in FIG. 1.

Figure 3:
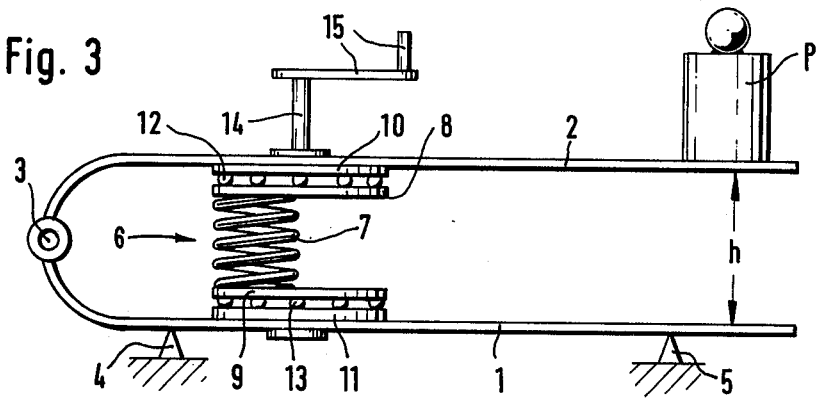
FIG. 3 represents the elements of FIG. 2 but with the spring unit in a different position.
Figure 4:
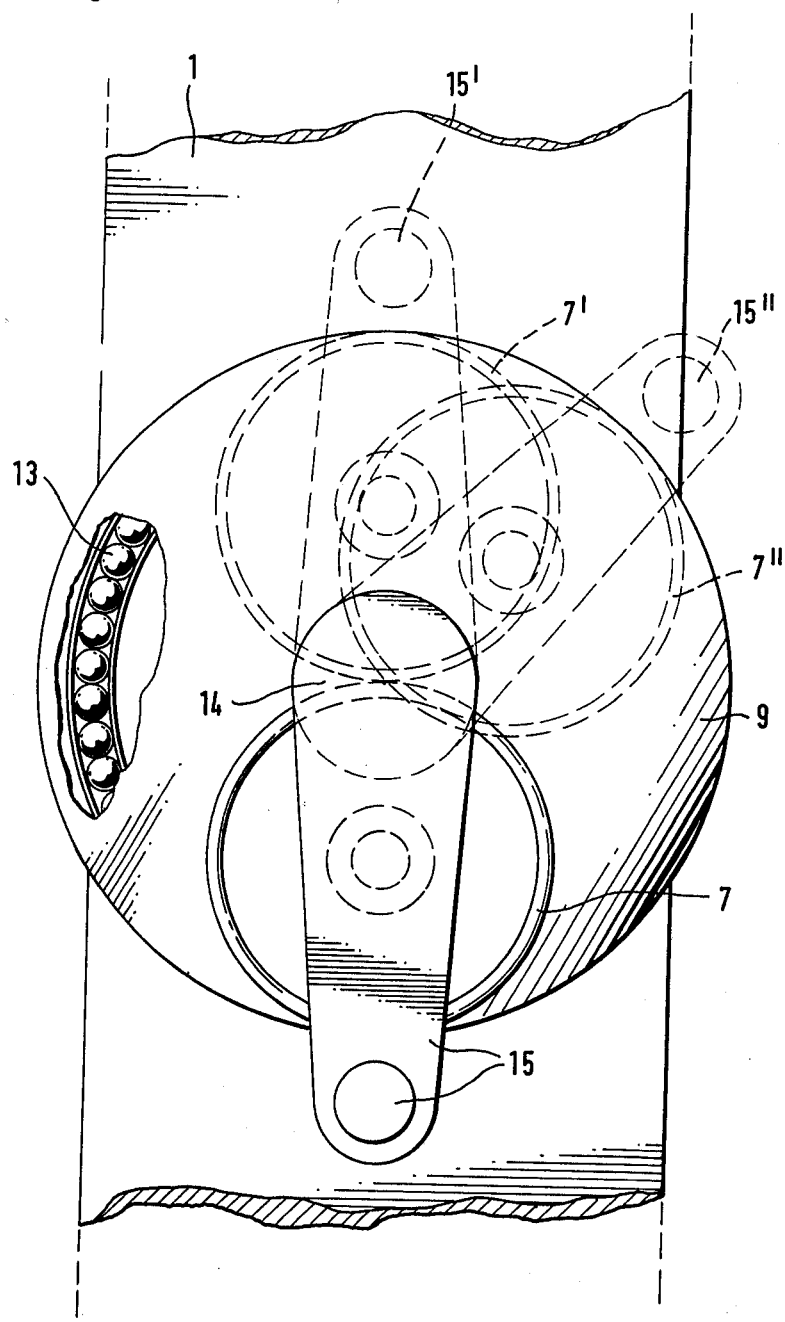
FIG. 4 represents a top view of the spring unit represented in FIGS. 1, 2, and 3, after removal of the upper disks with ball bearings.

The example represented in FIGS. 1, 2, and 3 is not drawn to a specific embodiment but only serves to demonstrate the principle of the invention. FIG. 4 represents a top view of FIGS. 1 through 3 showing spring unit 6 fastened to lower lever arm 1 after upper ball bearing 8, 10, 12 and upper lever arm 2 have been removed to provide a better view. The dashed positions 7' and 7" of helical spring 7, and 15' and 15" of crank 15 show the range of adjustment of the spring unit.

Figure 5:
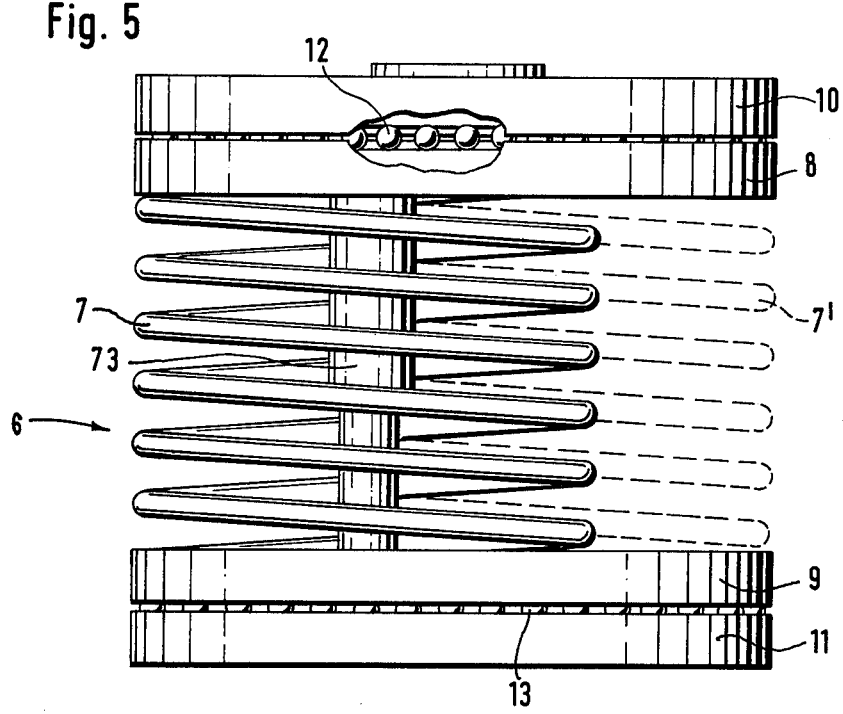
FIG. 5 represents in elevation an embodiment similar to that of FIG. 4, but with a helical spring of larger diameter relative to that of the ball bearing diameter.
Figure 6:
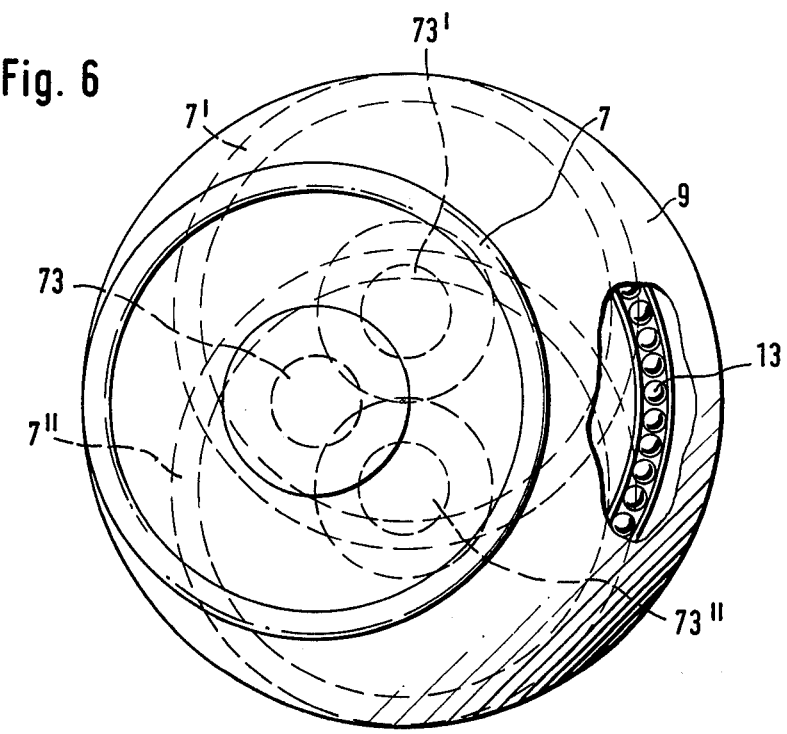
FIG. 6 represents a top view of the embodiment of FIG. 5, after removal of the upper disks with ball bearings.
Figure 7:
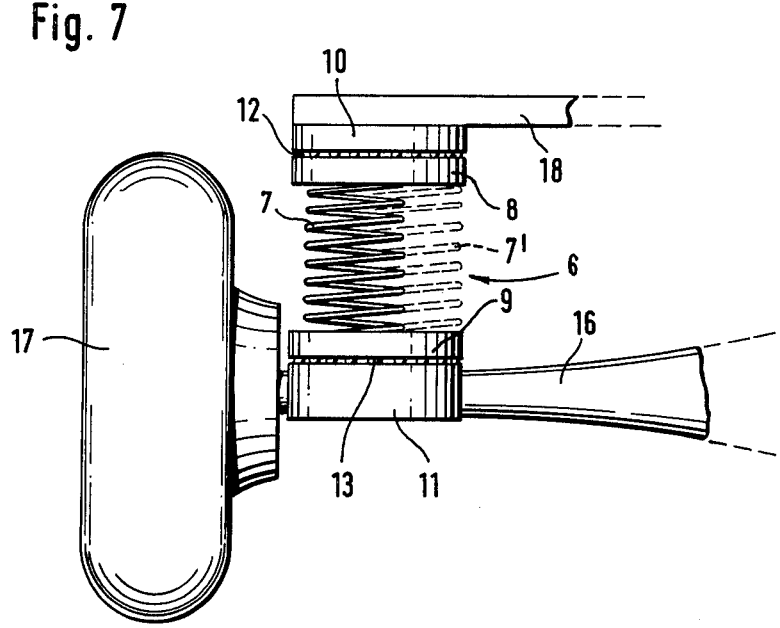
FIG. 7 represents the springing of the rear wheels of a vehicle by a springing device according to the present invention, viewed along the longitudinal axis of the vehicle.
Figure 8:
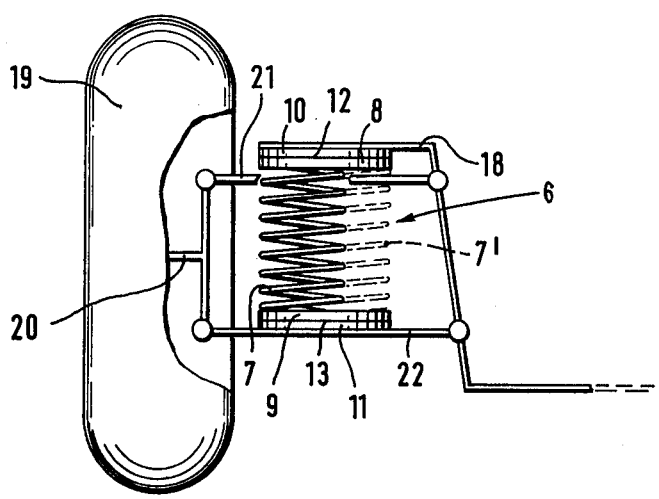
FIG. 8 represents schematically the springing of the front wheels in a parallelogram suspension, likewise viewed along the longitudinal axis of the vehicle.

In FIGS. 1 through 4 for indicating the principles of the invention, the spring diameter is shown as only half a disk diameter, for a clearer explanation of the function of the spring unit. However, in practice a spring diameter is preferable which is markedly greater than half the disk diameter, first to limit the eccentric loading of the rotation shaft, and also because the weight of a passenger automobile is considerably greater than the weight of its load. FIG. 5 represents schematically a spring unit 6, designed for a passenger automobile, whose spring diameter is about 70% of the disk diameter. In FIG. 6 a top view of the spring unit of FIG. 5 is represented in which upper ball bearing 8, 10, 12 is omitted. The practical application of spring units according to this invention to an automotive vehicle is made clear by FIGS. 7 and 8. FIG. 7 represents a rear wheel 17 mounted upon a divided rear axle 16 which is sprung to the chassis 18 by a spring unit 6. In FIG. 8 there is represented schematically the spring suspension of a front wheel to the chassis 18 and to the parallelogram suspension 20, 21 which is connected to wheel axle 20.

Figure 9:
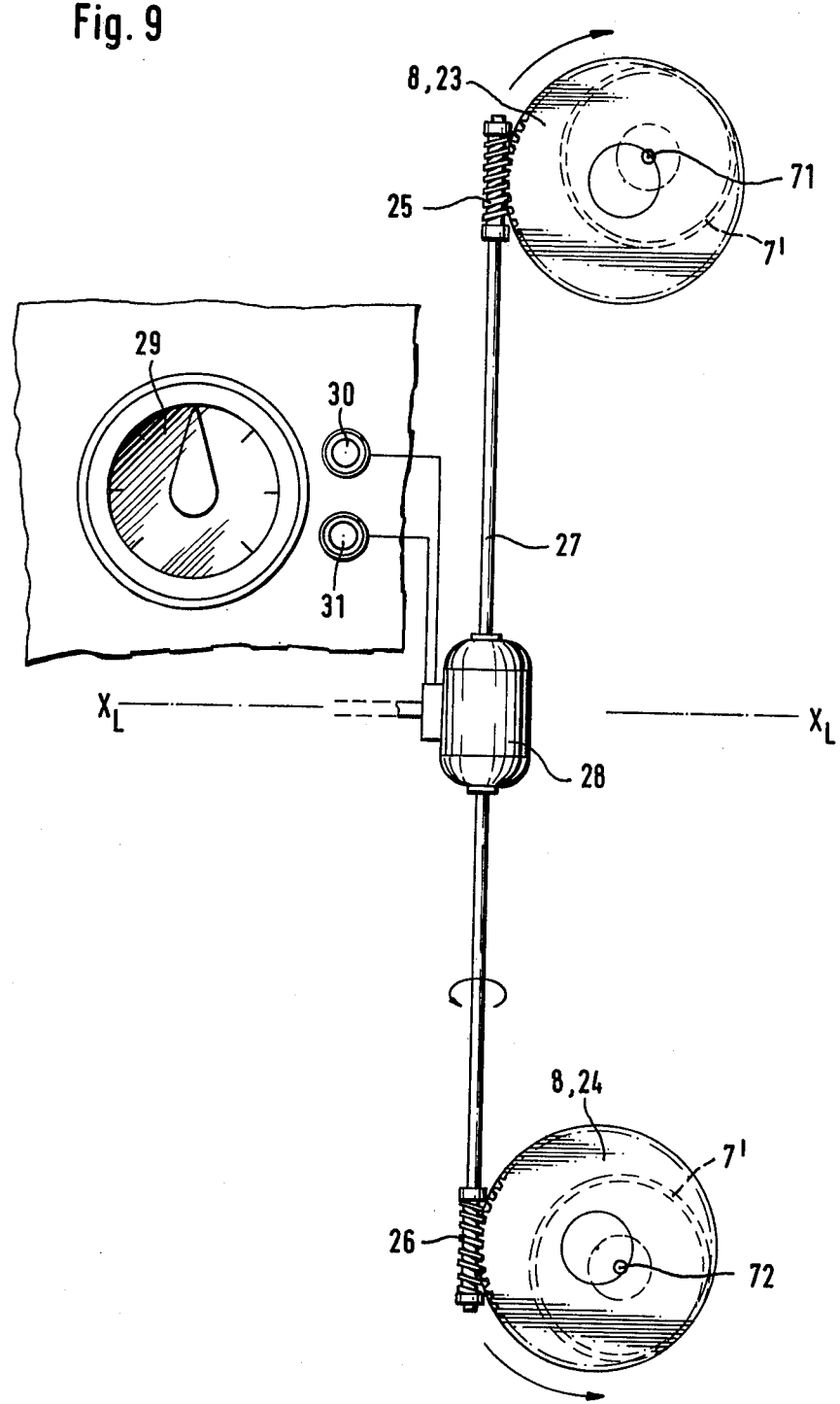
FIG. 9 represents schematically in top view an arrangement for the simultaneous adjustment of two rear wheel springing devices according to the invention, with a sketched representation of a control means mounted on the instrument panel.

The adjustment of the spring units of a pair of wheels must necessarily be such that the two spring units of the wheel pair (rear wheels or front wheels) are always turned through the same angular magnitude, but also necessarily in opposite directions of rotation. For stability it is requisite that the distance of a spring axis 71 from the vehicle longitudinal axis $X_L$ always have the same magnitude as the distance of the second spring axis 72 from the vehicle longitudinal axis. FIG. 9 represents an example of an adjustment arrangement which fulfills these conditions. The rotatable disks 8 belonging to ball bearings 8, 10, and 12 (e.g. of FIG. 5) are provided with worm gear rims 23 and 24, in which worms 25 and 26, respectively, are engaged. Worms 25 and 26 are mounted on adjustment shaft 27, which is driven by adjustment motor 28. The worm gears 8, 23, 25 and 8, 24, 26 ae driven by this in opposite directions. Thus it is assured that the helical spring axes 71 and 72 always have the same distance from vehicle longitudinal axis $X_L$.

The existing position of the helical spring axes may be read from an indicator 29 upon the vehicle instrument panel. The driver switches adjusting motor 28 on and off by pushbutton switches 30, 31.

Thus the driver is enaled, by spring units according to the present invention, to level his vehicle for any arbitrary load so that the distance $h$(cf. FIGS. 1 through 3) between chassis 18 and wheels 17 and 19 always remains the same when the vehicle is at rest. This leveling may be effected automatically by an automatic switching device which turns the adjustment motor on and off when the vehicle is standing still. (This has not been represented in the drawings)

Obviously the spring elements may be adjusted simply by hand. But in this case means must be available which insure that the angular rotation of the spring units of a pair of units is always mutually opposed in direction. By this hand adjustment it is possible to compensate for off-center loading in so far as each individual spring unit is equipped with its own hand crank. But even for hand operation, the worm drive represented in FIG. 9 is well suited; the adjustment shaft 27 may be driven by one or two hand cranks (not shown) instead of the adjustment motor 28. For any kind of hand drive the existing adjustment of the spring units should be readable on a scale or a rotary indicator.

In a particularly interesting embodiment of the invention a shock absorber 73 is located in axial coincidence with the spring axis 71 of the spring unit. This spring unit —shock absorber combination provides ideal leveling of the vehicle, since the shock absorber also is adjustable for all arbitrary loadings of the vehicle and not, as previously, only for a mean optimal value of load.

It should be observed that springing devices according to the present invention, in addition to increasing ride stability and riding comfort, offer the additional substantial advantage that the headlight axes are always correctly leveled.

The present invention permits the technical and particularly riding advantages which previously were obtainable only by expensive air suspension to be provided also for small and medium size vehicles.

The conceptual basis of this invention is not limited to the springing of vehicles, but is generally applicable wherever the distance between two sprung bodies is to be maintained constant despite variations in load.

For more general description of the present invention, the combination of rotatable plate 8 with fixed plate 10 and bearing balls 12 forms a thrust bearing; and the wheels nad axles, wheel bearings and the like upon which the vehicle rolls are known generically as running gear. The terms "hinged" and "pivoted" include any means for producing or permitting rotation, including bearings of any kind.

It will be understood that each of the elements described above, or two or more together, may also find a useful application in other types of devices differing from the types described above.

While the invention has been illustrated and described as embodied in a springing device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A springing device adjustable to various loads, such as are applied by a variously loaded vehicle supported by it upon running rear, comprising:
 a. two lever arms, hinged together at one end of each;
 b. a spring firmly attached at its opposed ends to two rotatable plates;
 c. such rotatable plates being pivoted eccentrically with respect to the attached spring, each to one said lever arm, whereby the elastic constant for displacements of the distal ends of the lever arms with respect to each other may be adjusted by rotating the said rotatable plates and the spring between them.

2. The springing device claimed in claim 1; further comprising a shock absorber mounted between said rotating plates for joint rotation with said spring.

3. The springing device claimed in claim 2, in which said spring is a helical spring and the shock absorber is mounted in axial alignment with the axis of the helical spring.

4. As a new product, a spring unit comprising:
   a. two thrust bearings aligned for rotation about a common axis, fastened to opposite ends of
   b. a helical spring whose central axis is parallel to but eccentric from the said common axis.

5. A springing device adjustable to various loads, particularly to those applied by a variously loaded vehicle, comprising two lever arms each having a first and a second opposite end portion, said first end portions of said lever arms being hingedly connected with each other and said second end portions of said lever arms being displaceable relative to each other; a spring having an axis and two opposite end sections each adjacent to a respective one of said lever arms; two plates each rotatable relative to a respective one of said lever arms, each of said end sections of said spring being connected to a respective one of said plates for joint rotation therewith, said plates being rotatable about a further axis which is eccentric relative to said axis of said spring, whereby the elastic constant for displacements of said second ends of said lever arms relative to each other may be adjusted by rotating of said plates together with said spring; and means for rotating at least one of said plates about said further axis, including a worm gear provided on said one plate and a worm engageable with said worm gear so as to cause rotation of said one plate.

6. The springing device claimed in claim 5, in which said worm is mounted on a shaft connected to a hand crank for manual rotation.

7. The springing device claimed in claim 5, in which said worm is mounted on a shaft connected to an electric motor for rotation thereby.

8. The springing device claimed in claim 5, and further comprising a similar second springing device also having a worm, the said worms being mounted on a common shaft and having such pitch direction that the rotatable plates of the two springing devices are rotated in opposite directions by rotation of the common shaft.

9. The springing device claimed in claim 5; and further comprising motor means operatively associated with said worm for rotating the same.

* * * * *